United States Patent [19]

Bentall et al.

[11] Patent Number: 4,556,182
[45] Date of Patent: Dec. 3, 1985

[54] DEVICE FOR THE ORIENTATION AND THE POSITIONING OF A USEFUL LOAD

[75] Inventors: Richard H. Bentall, Voorhout; Henry M. Briscoe, The Hague, both of Netherlands

[73] Assignee: Agence Spatiale Europeenne, Paris, France

[21] Appl. No.: 359,715

[22] PCT Filed: Jul. 1, 1981

[86] PCT No.: PCT/FR81/00086
§ 371 Date: Mar. 4, 1982
§ 102(e) Date: Mar. 4, 1982

[87] PCT Pub. No.: WO82/00218
PCT Pub. Date: Jan. 21, 1982

[30] Foreign Application Priority Data

Jul. 4, 1980 [FR] France ............... 80 14959

[51] Int. Cl.[4] ........................................... F16M 13/00
[52] U.S. Cl. ................................. 248/179; 403/51; 403/160; 74/18.1; 343/882
[58] Field of Search .............. 248/179; 403/160, 51; 74/18.1; 343/882

[56] References Cited

U.S. PATENT DOCUMENTS

| | | |
|---|---|---|
| 1,092,867 | 4/1914 | Sellew . |
| 1,922,431 | 8/1933 | Geyer .................... 74/18.1 |
| 2,542,038 | 2/1951 | Lewis .................... 403/160 |
| 2,941,407 | 6/1960 | Huber .................... 74/18.1 |
| 3,552,836 | 1/1971 | Oskam . |
| 3,601,343 | 9/1969 | Sivaslian ............... 74/18.1 |
| 3,662,661 | 5/1972 | Whitacre . |
| 3,712,481 | 1/1973 | Harwood . |
| 4,181,283 | 1/1980 | Rizzo . |

FOREIGN PATENT DOCUMENTS

| | | |
|---|---|---|
| 2449364 | 4/1976 | Fed. Rep. of Germany ...... 248/349 |
| 2821246 | 11/1979 | Fed. Rep. of Germany ...... 403/160 |
| 790486 | 11/1935 | France .................... 269/71 |
| 1415475 | 9/1965 | France . |
| 2039484 | 1/1971 | France . |
| 2379732 | 9/1978 | France . |
| 495032 | 9/1970 | Switzerland . |
| 563373 | 8/1944 | United Kingdom . |

*Primary Examiner*—J. Franklin Foss
*Assistant Examiner*—Robert A. Olson
*Attorney, Agent, or Firm*—Antonelli, Terry & Wands

[57] ABSTRACT

The present device comprises in combination a first element consisting of a base plate (8), at least a second element having a substantially cylindrical shape (9), of which one of its faces is in an inclined plane, at least a third element having a substantially cylindrical shape (10) of which one of its faces is an inclined plane, a fourth element consisting of a support plate (11) for the useful load, motor means for actuating at least one of those elements with respect to at least one of the other elements, means for coupling these elements between each other allowing a relative rotation of said elements, and means capable of preventing the rotation of one of said elements with respect to another of said elements. The device can be used for the orientation, positioning or displacement of a useful load, particularly to the pointing of solar panels, satellite antennae, telescopes, etc.

9 Claims, 14 Drawing Figures

PRIOR ART
FIG. 1
PRIOR ART
FIG. 2
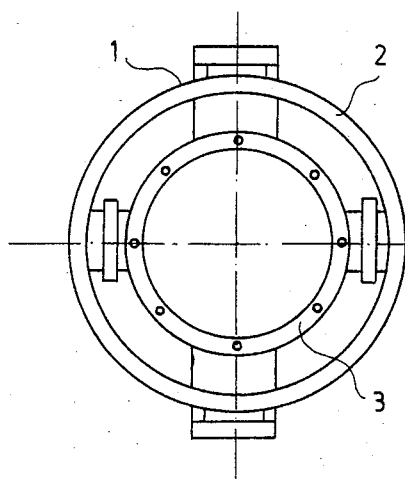
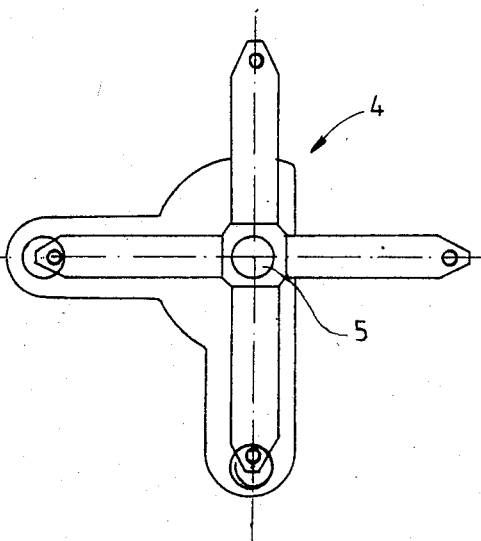
FIG. 3
FIG. 4
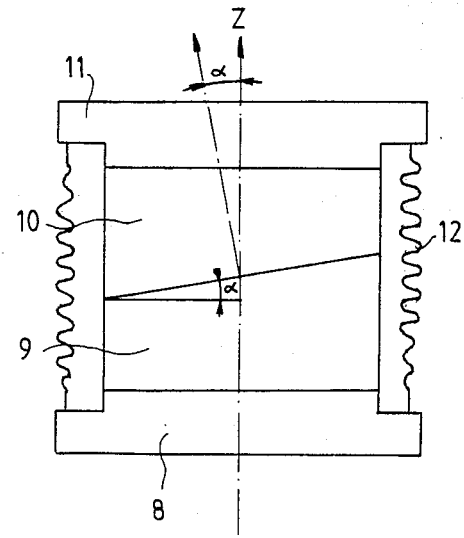
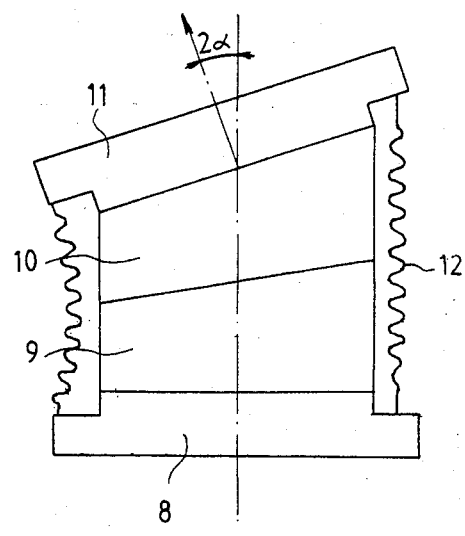

DEVICE FOR THE ORIENTATION AND THE POSITIONING OF A USEFUL LOAD

BACKGROUND OF THE INVENTION

The present invention relates to a mechanism whose role is to orientate, position or move a useful load sensitive to the orientation, in a precise specific direction or to position or to transmit motion to a useful load in a specific way with respect to a fixed platform.

The different functions fulfilled by such a mechanism, which will be described further on, whether their purpose is to position a useful load in a given angular position or to synchronize the movement, in consequence of the initial angular movement because the device is supported on a structure, or whether their purpose is to transmit motion to the useful load in opposition to a resistance or inertia or to supply a force directed against a second device, all these functions will be named in what follows "orientation and positioning of the useful load".

It is generally required of mechanisms which ensure the orientation and the positioning of a useful load, that they present a certain number of characteristics. Among these characteristics there is included, for example, the ability to support the device before, during and after orientation and positioning of the useful load, the ability to provide an orientation and positioning method which has the required accuracy either because of their own performance or because of their ability to respond to orders coming from an external control means, the characteristics represented by a small mass and a small volume, their ease of fixing to a mounting point and to the useful load, their reliability and the face that the break-downs to which these mechanisms may be subjected must nevertheless allow the useful load to maintain favorable orientation and positioning, as well as other characteristics required by the specific application.

Such mechanisms which provide orientation and positioning of the useful load, present applications which extend from aiming large telescopes to the positioning of delicate instruments. Such applications may comprise, for example, gyroscope and flight instrument tables in aircraft, orientation supports for telescopes, vertical reference platforms, elbow or cranked joints for articulated apparatus or robot devices and numerous other applications. In satellites, positioning and orientation devices for useful loads are needed to fulfill numerous functions, for example aiming and orientating solar panels, aiming masts and antennae, the orientation of inertial moment wheels, the aiming of instruments, the orientation of thrust devices and other exploration and positioning services.

The application of the basic principle of the present invention to these different functions may be easily understood with reference to the example given and to the corresponding descriptions. One example of an application in which the advantages of the invention are evident is that of antennae aiming in satellites. Such devices are commonly called "antenna pointing mechanism" and the abbreviation "APM" will be used to designate them in what follows.

The state of the art comprises antenna pointing devices of different generic types whose general diagram shown in FIGS. 1 and 2 illustrate two widely used systems.

FIG. 1 is a schematic representation of an antenna pointing device of the gimbal type. The essential structural parts of this device are the basic structure 1, the gimbal structure 2 and the useful load structure. The gimbal structure 2 is connected to the base structure 1 by means of a bearing or pivot suspension (not shown), and it is driven by an actuating device which may be in the form of a direct electromagnetic control or connected through a gear box, between the two structural parts, or by means of a linear actuating device applied between the two structures so as to define a relative rotation about axis A. The antenna structure is mounted on the gimbal structure by means of which it is driven, which allows it to acquire its position along two axes with respect to the interface of the satellite.

FIG. 2 is a schematical representation of an antenna pointing mechanism of the universal joint type in which the antenna is supported on a cross-shaped structure 4, itself mounted on a universal joint 5, that is to say a suspension having two or more axes with central disposition. Such a joint could be formed specifically by a ball and socket joint or by a twin axis gimbal bearing system or by a flexible element. In the application of this type of antenna pointing mechanism, the basic structure may be omitted and the surface of the satellite may be used and, similarly, the antenna may be mounted directly on the universal joint and be actuated directly. However, the fact of omitting these structures precludes control of the APM as a single mechanism and complicates its use.

These devices of the prior art present some drawbacks which are more especially the following:

in so far as their load capacity is concerned, the ability of these devices to provide a low mass with accurate bearing mounting and to support, at the same time, the load through the launching environment of the satellite, is very limited and it is consequently frequently necessary to include in the mechanism a so-called "safety" device which protects the APM during launching and which is freed by a separate actuating device such as a pyrotechnic system as soon as the satellite has reached its operational orbit;

in so far as the accuracy of pointing is concerned, these mechanisms have varying performances depending on their operating mode. When the positional information comes from inside the APM itself, their size and open form of construction make them sensitive to thermal variations, temperature gradients through the mechanism being particularly destructive from the point of view of obtaining high pointing accuracy. In the closed loop mode of construction which uses an external error sensor, high accuracy may be obtained in generally all types of APM, as long as a sufficiently small angular differential increase may be imposed on each axis independently and as long as the backlash is small and the rigidity high and as long as the control system is able to respond to errors in time;

in so far as their mass in concerned, these devices of the prior art normally have a high mass due to their very construction and to the mass of the systems which are associated therewith-pyrotechnic systems, safety devices and additional structures required for the support;

in so far as the ease is concerned with which these systems may be fixed to the satellite or to the useful load, the large size of these devices limits use thereof, more particularly that of the universal joint device, to where there is a large mounting area;

in so far as the breakdowns to which they may be subjected is concerned, it is often desirable for an APM system, which normally maintains the antenna pointed in a fixed direction but which may be required to periodically re-point the antenna under control in a different direction, to be able to come back to its nominal fixed direction in the case of breakdown of one of the actuating devices which control the axes. This is extremely difficult to obtain and the problem is usually resolved by adopting pyrotechnic triggering devices which uncouple the actuating device affected (which is not always necessary if, for example, a motor drives the axis directly without going through a gear system, and by providing the APM with another device for bringing the antenna back to its nominal position and another pyrotechnic system for locking the antenna safely in this position;

in so far as the complexity is concerned, it is soon evident that the devices of the prior art use a greater complexity for achieving their function than a device such as the one forming the subject of the present invention, which will be described in what follows.

SUMMARY OF THE INVENTION

The present invention aims at providing a device for orientating and positioning a useful load, which meets better the requirements of practice than the previously known devices relating to the same purpose, particularly:

in that the proposed device is a simple and accurate twin axis orientation and positioning device;

in that it is capable of coming back to its nominal orientation should one of the actuating devices used in its construction break down;

in that it is compact and of relatively small size but nevertheless capable of supporting a useful load of significant mass in comparison with the mass of the device itself;

in that the device of the invention may be easily sealingly closed to ensure protection of the mechanism which it contains, allowing use of lubricants without fear of leakage to the external environment, and to provide a closed mechanism which allows uniform temperatures to be obtained in the device, thus reducing the harmful effects of temperatures and temperature gradients;

in that the orientation device of the invention may be used in a satellite and may withstand high launching loads without requiring the introduction of complex safety devices.

The present invention provides a device for orientating and positioning a useful load, characterized in that it comprises, in combination, a first element formed by a base plate, at least a second element, substantially cylindrical in shape, one of whose faces is an inclined plane, at least a third element, substantially cylindrical in shape, one of whose faces is an inclined plane, a fourth element formed by a platform supporting the useful load, drive means for actuating at least one of these elements with respect to at least one of the other elements, means for coupling these elements together, allowing mutual rotation of said elements and means adapted to prevent rotation of one of said elements with respect to another of said elements.

Besides the preceding arrangements, the invention further comprises other arrangements which will be clear from the following description.

The invention relates more particularly to devices for orientating and positioning useful loads, as well as these devices equipped with useful loads and the apparatus provided with useful loads capable of being orientated and positioned by means of said devices; the invention also relates to the means used for constructing said devices and the assemblies comprising them.

BRIEF DESCRIPTION OF THE DRAWINGS

The invention will be better understood from the following description which refers to the accompanying drawings in which:

FIG. 3 is a schematical representation of a cross section of a device for orientating a useful load, in accordance with the invention;

FIG. 4 is a schematical representation of a a cross section of a device in accordance with the invention, in which the second cylindrical element comprising an inclined plane face has undergone a rotation of 180°;

Figure 5:
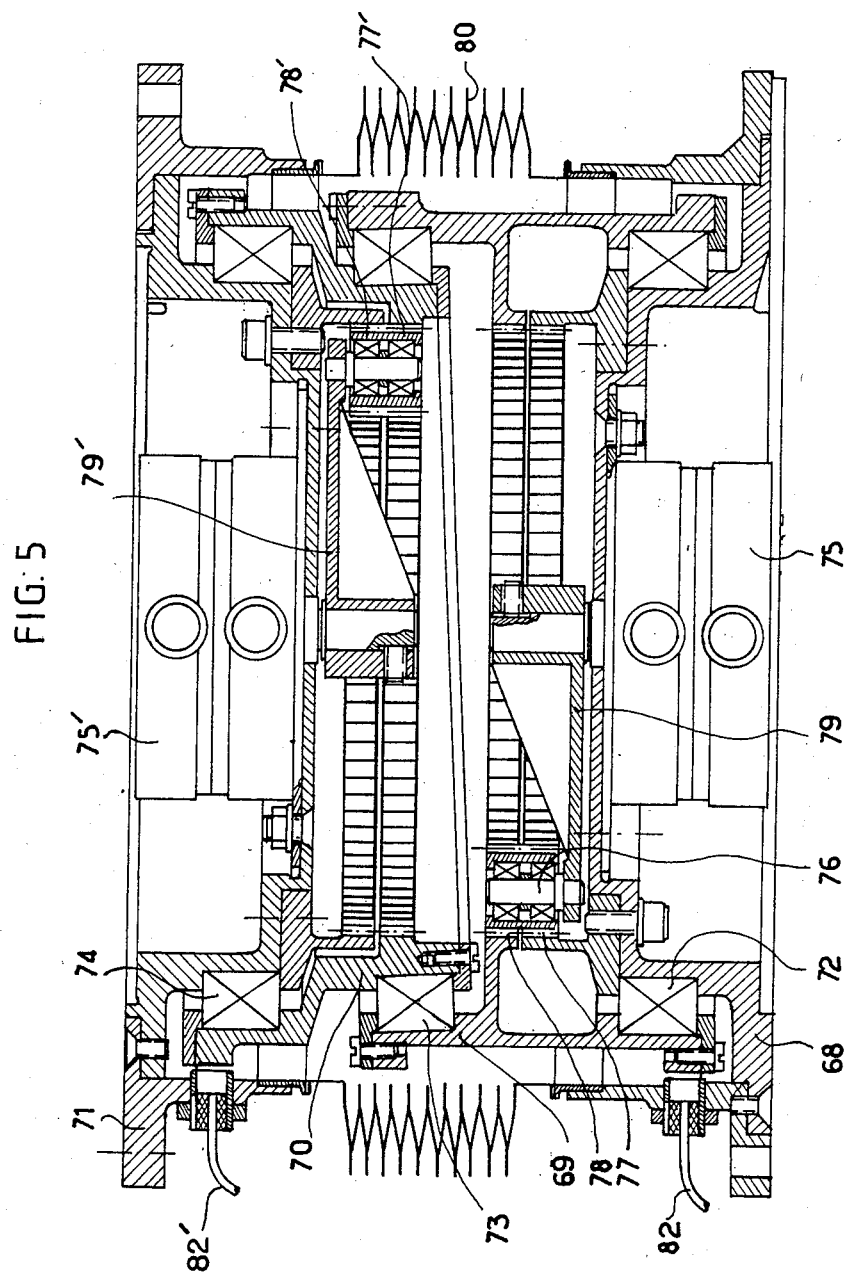
FIG. 5 shows a cross section of a general plan of the device corresponding to the structure of FIG. 3.

It will of course be readily understood that these devices and the corresponding descriptive parts are given solely by way of illustration of the subject of the invention, of which they in no way form a limitation.

DESCRIPTION OF THE PREFERRED EMBODIMENTS

To simplify the description, it will be assumed that the device is essentially formed by five parts, as shown in FIG. 3, namely: a base plate 8, a first cylindrical platform 9, one of whose faces is an inclined plane, a second cylindrical platform 10, one of whose faces is an inclined plane and a platform 11 supporting the useful load, as well as a bellows 12, flexible in flexion and extension but rigid in torsion, which connects the base plate 8 and support platform 11 to each other, so that, if a rocking movement occurs between elements 8 and 11, a rotation about axis Z cannot take place.

Elements 8 and 9, 9 and 10, 10 and 11 are assembled together by appropriate bearings which allow mutual rotation between these pairs of elements. The angles of the faces of the cylindrical elements 9 and 10 which are in an inclined plane, are equal and the axes of the bearings disposed between elements 8 and 9 and 10 and 11 are coincident and normal with respect to the surface of the base mounting of element 8 and to the surface of the antenna mounting of element 11. This is why, in the normal starting position, the two mounting surfaces are parallel and the normal to the plane of element 11 coincides with axis Z.

The movements of the different elements have an influence on the orientation of the normal to the plane of the useful load. FIG. 4 shows the system after rotation of element 10 through an angle of 180°.

In the application of the antenna pointing device taken as an example for illustrating the invention, it is advantageous to prevent rotation about the axis Z in some cases, for example for polarized antenna and profiled beams, in which the satellite maintains the pointing of axis Z. It is on the bases outlined above that the example of the invention shown in FIG. 3 rests, in which a bellows system 12 has been used for connecting element 11 to element 8.

It is clear that, whereas a structure comprising no bellows requires as a rule three motors for driving each of the bearings, the structure shown in FIG. 3 only requires two motors applied to any two adjacent bearings of the three bearings existing in the structure in accordance with the invention. It is convenient to use the two bearings which are between elements 8 and 9 and between elements 10 and 11 so as to avoid the need of causing the current to pass through a rotating connection.

A general plan of the embodiment given by way of example of the invention is shown in FIG. 5, which corresponds to the structure of FIG. 3.

This device comprises a base 68 which corresponds to base plate 8, a first element 69 having the same function as element 9 of FIG. 3, a second element 70 having the same function as element 10 of FIG. 3, a platform 71 corresponding to platform 11 of FIG. 3 for supporting the useful load, a first bearing 72 between the base 68 and first element 69, a second bearing 73 between second element 70 and first element 69, a third bearing 74 between platform 71 and second element 70, a first actuating device 75,76,77,78, 79 as described below and a second actuating device 75', 76', 77', 78', 79' also referred to below as well as the bellows 80 corresponding to bellow 12 in FIG. 3.

There can also be seen in this figure a device 82 for measuring the position of element 69 with respect to element 68, and a device 82' for measuring the position of element 70 with respect to element 71. A position sensor is very useful in the practical application of the device in accordance with the present invention. It is as a rule sufficient to know the measured position for each rotation referenced and to use a step by step driving mode which provides increases of known quantities, with respect to these given positions. When the errors come from an external source, a positional sensor is not always an essential element.

The actuating devices each comprise a motor 75, 75', a gear 76, 76', ring gears 77, 78, 77', 78' mounted respectively on the base, the two cylindrical elements and the support for the useful load, as well as actuating arms 79, 79'.

Since the two actuating devices are identical, only a single one will be described by way of example in what follows: a stepping motor 75 producing a definite angular motion when a voltage pulse is applied drives arm 79 to which is connected a planet gear 76 which may rotate freely on the arm. This gear drives the ring gears 77 and 78, 77 being mounted on base 68 and 78 mounted on first element 69. One of the ring gears comprises at least one tooth less than the other so that a full movement of arm 79 produces a locating of base 68 with respect to element 69, corresponding to the difference in the number of teeth.

Bearings 72, 73, 74 shown in FIG. 5 are four point or "gothic arch" contact bearings which are known in the art and allow a single type of bearing to be adopted, contrary to the prior art where two or more bearing systems are conventionally used.

Thus, as seen in FIG. 5 and described above, the element 69 is mounted on base 68 for rotation by means of the bearing 72. This bearing is a four point or "gothic arch" contact bearing as noted above. The plane of the bearing is parallel to the lower surface or plane of base 68, both being horizontal as shown in FIG. 5. With a like bearing 73, element 70 is mounted to element 69 except that the plane of the bearing 73 is inclined to the plane of bearing 72 and the plane of the base 69 at a predetermined angle α (see FIG. 3). That is, as shown in FIG. 5, the bearing receiving portions at the upper end of element 69 and lower end of element 70 have parallel faces for receiving the bearing 73 which are inclined to the planes of the base 68 and the bearing 72. The bearing 74 couples the platform 71 and element 70 in a manner similar to the coupling between element 69 and base 68.

The advantages of the embodiment described by way of example in what has gone before are especially the following:

in so far as the capacity for supporting the load is concerned, the construction of the device allows large diameter bearings to be used without the device of the invention being penalized by an excessive mass as in the prior art devices. This advantage which is added to the fact that, since the reflected torque in the actuating device is very low, an actuating device capable of withstanding backdriving forces may prevent rotation of the panel from its preadjusted position and avoid using a safety device or a locking device during launching, in numerous practical applications;

in so far as the accuracy of pointing is concerned, the compactness of the device of the invention contributes to minimizing the thermal gradients which are particularly unfavorable to the accuracy of pointing. The increased freedom of being able to use liquid lubricants because of the closed environment, contributes to a large extent in promoting the transfer of heat through the bearings, thus reducing the thermal gradients in this zone. Moreover, since the total variation of pointing which is required in the case of antennae is usually small (less than $\pm 4°$, and in some cases where re-pointing is not required, less than $\pm 0.4°$), a very favorable ratio may be obtained between the movement of the actuating device and the orientation of the antenna, which allows high accuracy or small pitch dimensions to be obtained.

in so far as the ease of fixing the device to the antenna or to the satellite is concerned, it will be easily understood that the compactness of the device forms an important advantage in favor of the device of the invention. Furthermore, the antenna may be supported at an angle with respect to the nominal parallel alignment without having to modify the mechanism, which considerably facilitates integration in the cases where there exist particular stresses of geometry during launching.

in so far as the type of breakdown is concerned to which the device of the invention may be subjected, in the case of breakdown of an actuating device, it is possible to bring the antenna back to its nominal parallel alignment (0.0) by actuating the actuating device which is not broken down.

Furthermore, after having reached the position (0.0), the antenna will maintain its position without having to supply energy to the device, and without having to use a locking system, because of the resistance to backdriving of the actuating device.

in so far as the mass and complexity are concerned, the invention provides an antenna pointing mechanism structure which offers considerable advantages because of its mechanical simplicity, with respect to the devices of the prior art, resulting in economies in mass not only in the device itself, but also in the auxiliary systems, for example, in the caging systems and in the actuating devices and their control system, as well as in the pyrotechnic systems.

It will be readily understood that there exist a large number of variations in arrangement and structure for the embodiment shown in FIG. 5.

Numerous techniques are available for preventing rotation of element 11 with respect to element 8, for example by means of a flexible diaphragm one of whose edges is fixed to plate 8 or to an extension thereof; a bellows such as 20 forms a preferred example of a diaphragm for it allows all degrees of freedom except torsion. The incorporation of a third actuating device with its rotational control provides a degree of pointing along three axes, so that different hybrid performances may be obtained.

Figure 6A:
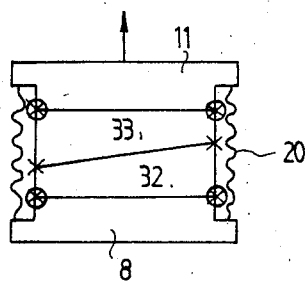
FIG. 6a shows schematically three variations a, b, c and their operational characteristics.

FIG. 6a shows a schematic representation of a device of the invention as shown in FIGS. 3 and 5.

Figure 6B:
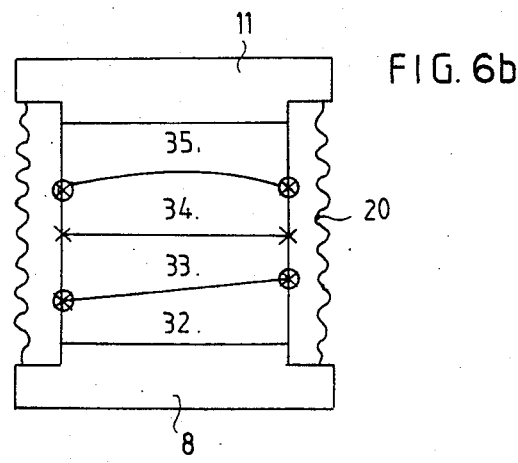
Figure 6C:
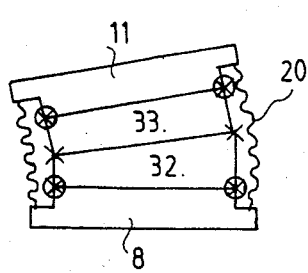

FIG. 6b shows a variation of the device of the invention, shown and described by way of non limiting example, according to which plane of the bearing which is between element 32 and element 33 angle with respect to the plane of the base 8; the central bearing which is between element 33 and element 34 is in a horizontal plane and the angle of the plane of the bearing at the top between element 34 and element 35 is inclined a given angle. FIG. 6c shows a similar operation, obtained from the device of FIG. 5, in which element 33 is caused first of all to rotate through 90° before fixing the bellows 20.

In the diagrams to which reference has just been made, there is shown by X the positions where bearings are required and by X̄ those where a device for actuating the bearing is required.

The preceding description has referred up to present to a single embodiment. It is however clear that the present invention gives rise to a large series of devices presenting different characteristics which have their place among devices for orientating useful loads. FIGS. 8a-f show schematically examples of such devices.

It is clear that the invention allows other devices to be constructed and that different hybrid operations may be obtained by appropriately using actuating devices or coupling devices for achieving the required orientation. One of the advantages of achieving these movements by means of essentially mechanical means is shown by the simplification of the electronic control required.

Figure 7A:
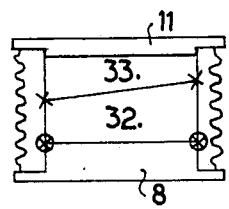
FIG. 7f shows schematically variations a, b, c, d, e, f, in which the angles of inclination of the superimposed cylindrical elements are chosen so as to prevent any rotation about the axis Z of the device and to define a controlled approximation with respect to said axis or a Cartesian movement.

FIG. 7a shows a device which procures a controlled approximation of the positioning possible with the embodiment of FIGS. 3–5 of the invention. This motion is shown as being offset with respect to axis Z, but it is clear that the offset can be varied by appropriately choosing the geometry of the mounting flanges so as to be able to obtain the approximation of axis Z about a chosen axis.

Figure 7B:
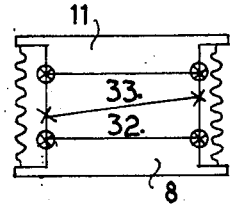
Figure 7C:
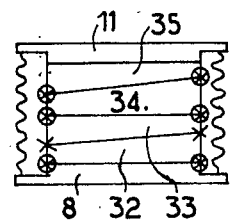

FIG. 7b shows the basic embodiment of the device described by way of example in FIG. 3 and in FIG. 7a as previously described.

FIG. 8c shows a device comprising four bearings and three actuating devices.

Figure 7D:
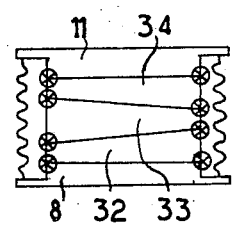

FIG. 7d shows another possibility of the invention, in which the actuating device—or coupling—is applied to all the bearings, in a device whose torsion is prevented, providing variations of these operating modes or hybrid operating modes. In FIG. 7d, the actuating device applied between elements (32, 33) and (33, 34) may be either "locked", in which case the bearing concerned cannot rotate, or "unlocked", in which case the bearing is free to rotate. If we assume that the actuating device of (32,33) is locked and that the actuating device of (33,34) is unlocked, in this case the first movement using the actuating devices of (8, 32) and of (34,35) supplies a capacity of orientation similar to that of the device described by way of example which uses the elements (8, [32, 33] 34, 35). If at present, it is the actuating device of (32, 33) which is unlocked and the actuating device of (33, 34) which is locked, in this case in a second movement, the device (8, 32, [33, 34,] 35) provides an orientation about the nominal zero position dictated by the first movement. It should be noted that in these movements the angles of inclination differ.

Figure 7E:
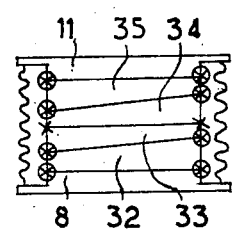

FIG. 7e shows a device which provides a Cartesian movement.

Figure 7F:
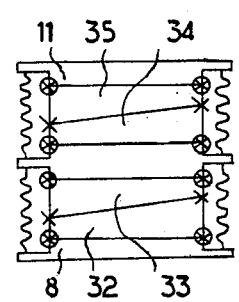

FIG. 7f shows another device which provides a Cartesian movement, this device forming a combination of two devices of the type described in FIG. 7b which are superimposed.

As it follows from what has gone before, the invention is in no way limited to those of its embodiments and modes of application which have just been described more explicitly: it embraces, on the contrary, all variations thereof which may occur to a man skilled in the art, without departing from the scope or spirit of the invention.

What is claimed is:

1. A device for orienting and positioning a useful load comprising a base lieing in a first plane, a platform for supporting said useful load, a plurality of substantially cylindrical intermediate elements arranged in series between said base and said platform, respective coupling means coupling for relative rotation said base to an intermediate element located adjacent said base, adjacent intermediate elements to one another, and said platform to an intermediate element located adjacent said platform, at least two adjacent intermediate elements having respective adjacent parallel faces inclined with respect to said first plane and coupled for relative rotation by said coupling means, wherein means are provided between said base and said platform for preventing rotation of one of these with respect to the other, said means for preventing rotation being flexible in flexion and extension but rigid in torsion, and wherein means are provided for effecting relative rotation between said at least two intermediate elements.

2. The device as claimed in claim 1, wherein said plurality of substantially cylindrical intermediate elements consists of two intermediate elements arranged in series between said base and said platform.

3. The device as claimed in claim 1, wherein said plurality of substantially cylindrical intermediate elements consists of three intermediate elements arranged in series between said base and said platform.

4. The device as claimed in claim 3, wherein said three intermediate elements include a first intermediate element located adjacent said base, a second intermediate element located adjacent said first intermediate element and a third intermediate element located adjacent said second intermediate element and adjacent said platform, said first and second intermediate elements having respect adjacent parallel faces inclined with respect to said first plane and coupled for relative rotation by said coupling means, and said second and said third intermediate elements having respective adjacent parallel faces inclined with respect to said first plane and coupled for relative rotation by coupling means.

5. The device as claimed in claim 1, wherein said plurality of substantially cylindrical intermediate elements consists of four intermediate elements arranged in series between said base and said platform.

6. The device as claimed in claim 5, wherein said four intermediate elements include a first intermediate element located adjacent said base, a second intermediate element located adjacent said first intermediate element, a third intermediate located adjacent said second intermediate element, and a fourth intermediate element located adjacent said third intermediate element and said platform, the first and second intermediate elements having respective adjacent parallel faces inclined with respect to said first plane and coupled for relative rotation by coupling means, and said third and fourth intermediate elements having respective adjacent parallel faces inclined with respect to said first plane and coupled for relative rotation by coupling means.

7. The device as claimed in claim 1, wherein said means for effecting relative rotation between said at least two intermediate elements comprises first motor means for rotating said intermediate element adjacent said base with respect to the base, and second motor means for rotating said intermediate element adjacent said platform with respect to said platform.

8. The device as claimed in claim 1, wherein said coupling means are bearings.

9. The device as claimed in claim 1, wherein said device comprises two devices as recited in claim 1 which are superimposed.

* * * * *